Figure 1:
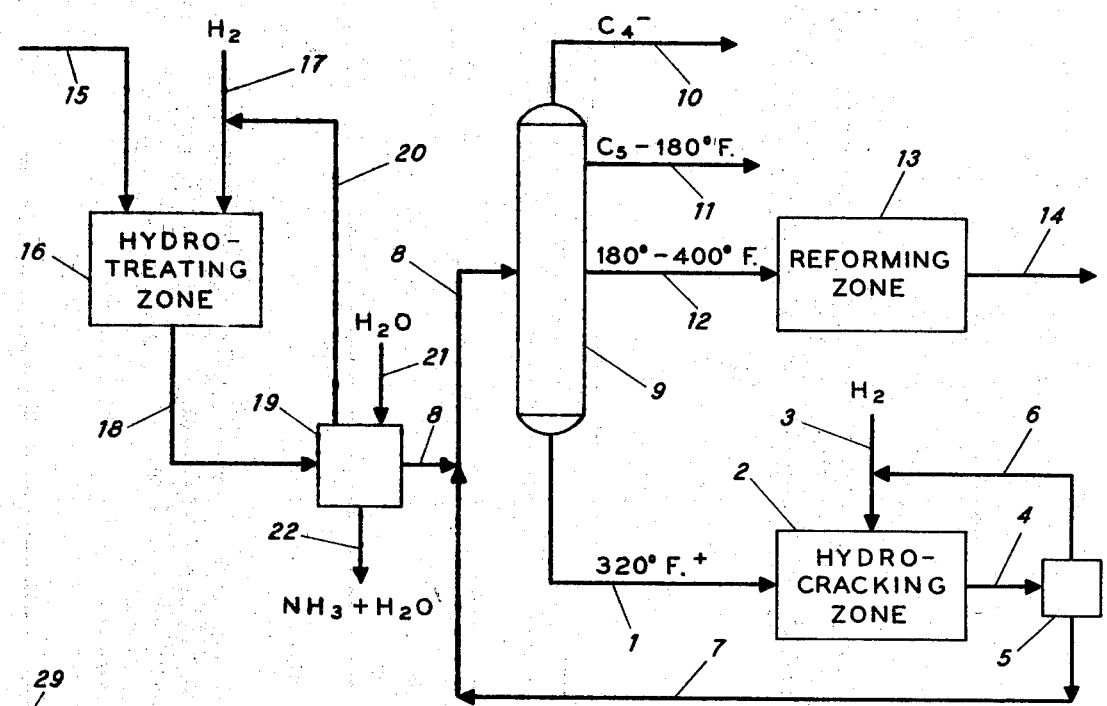

INVENTOR
JAMES R. KITTRELL
BY
ATTORNEYS

United States Patent Office 3,546,095
Patented Dec. 8, 1970

3,546,095
CATALYST BODY CONSISTING OF PHYSICAL MIXTURE OF DIFFERENT CATALYSTS
James R. Kittrell, El Cerrito, Calif., assignor to Chevron Research Company, San Francisco, Calif., a corporation of Delaware
Filed Nov. 4, 1968, Ser. No. 773,097
Int. Cl. C10g 13/00
U.S. Cl. 208—60   12 Claims

ABSTRACT OF THE DISCLOSURE (A) A catalyst body consisting of a physical mixture of pellets or other particles of different catalysts, said different catalysts comprising: a first catalyst comprising a crystalline zeolitic molecular sieve cracking component and a hydrogenating component selected from the group consisting of rhenium and compounds of rhenium; and a second catalyst comprising a crystalline zeolitic molecular sieve component, a component selected from silica-alumina gel, silica-alumina-titania gel and silica-alumina-zirconia gel, and a component selected from Group VIII metals and compounds thereof.

(B) Processes using said catalyst body.

INTRODUCTION

This invention relates to catalytic hydrocarbon conversion, including hydrocracking of petroleum distillates and solvent-deasphalted residua, to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Rhenium is named as a metal with which the molecular sieve may be loaded, but it is not clear from the patent which reactions such a catalyst would be used to catalyze. No example of a rhenium-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the noble metals, and the absence of any interest in rhenium except a passing mention, there is no guide in the patent either as to the applicability of a rhenium-molecular sieve catalyst for the hydrocracking reaction in particular, or to the amount of rhenium such a catalyst should contain, or to the hydrocracking results that might be expected.

It is also known in the art to use 2 weight percent rhenium in association with a gel-type silica-alumina cracking component for the hydrocracking of hydrocarbon fractions. For example, Wilson U.S. Pat. 3,278,418 makes such a disclosure. However, it is also known that such a catalyst has low hydrocracking activity, and that a promoter must be used with the rhenium to provide a catalyst having acceptable activity. Accordingly, the Wilson patent indicates that the rhenium-silica-alumina catalyst of his Examples 1 and 2 had activity indices of 42 and 47, respectively, whereas with the addition of a silver promoter for the rhenium, activity indices as high as 95 could be achieved. The data in the Wilson patent indicate that with rhenium levels as high as 2 weight percent, the rhenium-silica-alumina hydrocracking catalyst had only moderate activity. A higher hydrocracking activity would have been obtained with a higher rhenium level, but the cost of rhenium makes higher levels undesirable. Wilson was able partially to solve the problem of maintaining low levels of rhenium and adequate hydrocracking activity by adding a second hydrogenation component—silver—to the catalyst. However, this was accomplished only at a sacrifice in catalyst stability. As correctly indicated by Wilson, a hydrocracking catalyst having a silica-alumina cracking component is extremely nitrogen-sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that conventional catalysts having a crystalline zeolitic molecular sieve cracking component and a platinum hydrogenating component are sulfur-sensitive, and that while they are more sensitive to organic sulfur compounds they also are sensitive to $H_2S$. In each case the sulfur acts as a poison, particularly for the hydrogenation component, and reduces the hydrogenation activity of the catalyst, which in turn increases the fouling susceptibility of the catalyst.

OBJECTS

In view of the foregoing, objects of the present invention include providing a novel catalyst body useful for hydrocracking, and a novel hydrocracking process using said catalyst body, said catalyst body comprising two different catalysts, said catalyst body producing results in hydrocracking service not achievable by use alone of any separate catalyst contained therein, each of said two different catalysts having a cracking component less sensitive to nitrogen poisoning than silica-alumina gel, and one of said different catalysts:

(1) Having a rhenium or rhenium compound hydrogenating component;

(2) Having a high hydrocracking activity with economically low levels of said hydrogenating component;

(3) Having a high stability with low levels of said hydrogenating component, even in the presence of an additional hydrogenating component.

It is a further object of the present invention to provide various embodiments of a hydrocracking process using a catalyst body having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

Figure 2:
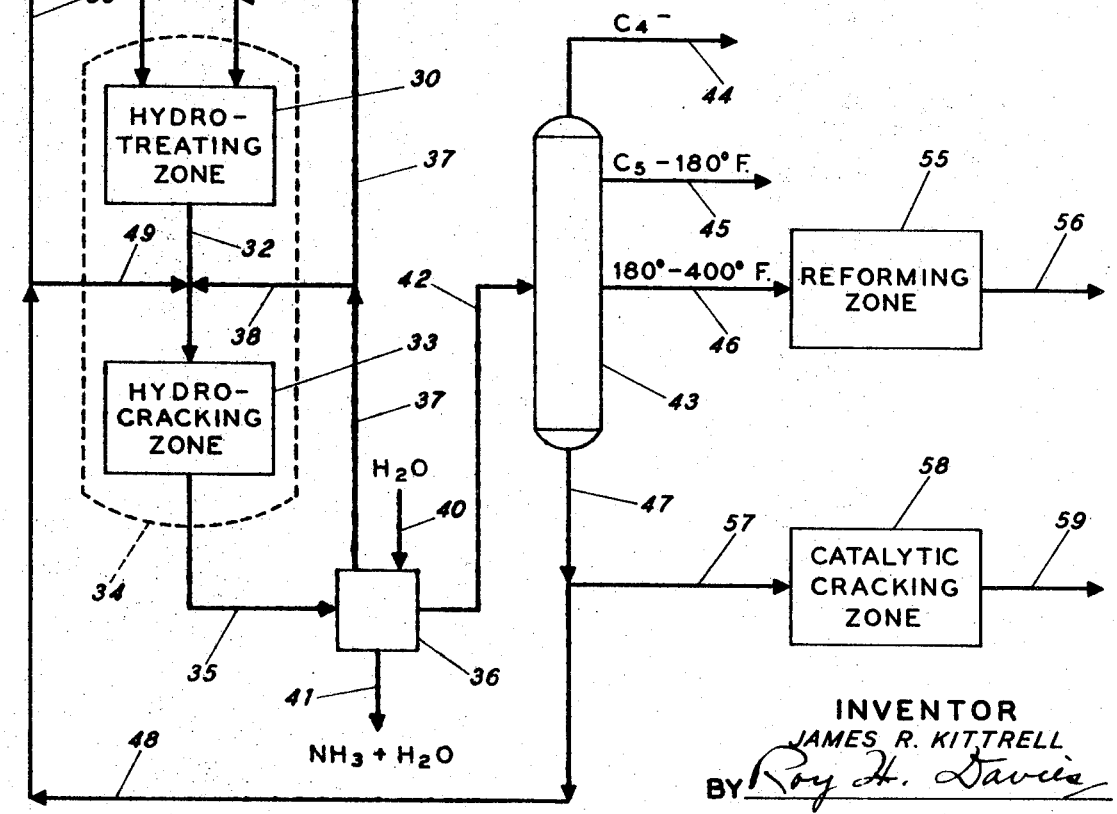

In the drawing, FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone procedes a hydrocracking zone in a single reactor shell, and embodiments wherein a selected fraction from the hydrocracking zone is catalytically cracked.

STATEMENT OF INVENTION

In accordance with one embodiment of the present invention there is provided a catalyst body consisting of a physical mixture of pellets or other particles of different catalysts, said different catalysts comprising:

(1) A first catalyst comprising a crystalline zeolitic molecular sieve component, and a component selected from rhenium and compounds of rhenium, and (2) A second catalyst comprising a crystalline zeolitic molecular sieve component, a component selected from silica-alumina gel, silica-alumina-titania gel and silica-alumina-zirconia gel, and a component selected from Group VIII metals and compounds thereof.

In accordance with separate additional embodiments of the present invention:

(1) Said second catalyst further comprises a component selected from Group VI metals and compounds thereof;

(2) Said crystalline zeolitic molecular sieve in said second catalyst is substantially in the ammonia or hydrogen form and is substantially free of any catalytic metal or metals; by "substantially free of any catalytic metal or metals" is meant no more than 0.5 weight percent of catalytic metal or metals, based on the molecular sieve, including no more than 0.1 weight percent of a noble metal or metals. The catalytic metal or metals include the Group VI and Group VIII metals, and exclude sodium;

(3) Said rhenium or compound thereof is present in said first catalyst in an amount of 0.01 to 3.0 weight percent of said first catalyst, calculated as metal;

(4) Said Group VIII metal or compound thereof is present in said second catalyst in an amount of 0.01 to 15 weight percent, based on said second catalyst and calculated as metal;

(5) Said crystalline zeolitic molecular sieve is present in said second catalyst in an amount of 1 to 50 weight percent thereof;

(6) Said Group VIII metal or compound thereof in said second catalyst is nickel or a compound thereof, and said second catalyst further comprises tin or a compound thereof.

In accordance with an additional embodiment of the present invention there is provided a catalyst body consisting of a physical mixture of pellets or other particles of different catalysts, said different catalysts comprising:

(1) A first catalyst consisting essentially of a crystalline zeolitic molecular sieve component and a component selected from rhenium and compounds of rhenium;

(2) A second catalyst consisting essentially of:

(A) A porous Xerogel comprising:

(a) At least 15 weight percent silica, (b) Alumina, in an amount providing an alumina-to-silica weight ratio of 15/85 to 80/20, (c) Nickel, in the form of metal, oxide, sulfide or any combination thereof, in an amount of 1 to 10 weight percent of said Xerogel, calculated as metal, (d) Tungsten, in the form of metal, oxide, sulfide or any combination thereof, in an amount of 5 to 25 weight percent of said Xerogel, calculated as metal;

(e) Titanium oxide, in an amount of 1 to 10 weight percent and said Xerogel, calculated as metal, (B) A crystalline zeolitic molecular sieve, in an amount of 1 to 50 weight percent of said catalyst, said crystalline zeolitic molecular sieve being in the form of particles, said particles being dispersed through said Xerogel.

Said second catalyst having an average pore diameter below 100 angstroms and a surface area above 200 square meters per gram.

In accordance with an additional embodiment of the present invention there is provided a catalyst body consisting of a physical mixture of pellets or other particles of different catalysts, said different catalysts comprising:

(1) A catalyst comprising:

(A) A crystalline zeolitic molecular sieve, and (B) A hydrogenating component selected from rhenium and compounds of rhenium; and (2) A catalyst comprising:

(A) A gel matrix comprising:

(a) At least 15 weight percent silica, (b) Alumina, in an amount providing an alumina-to-silica weight ratio of 15/85 to 80/20, (c) A Group VIII component, in the form of metal, oxide, sulfite or any combination thereof, in an amount of 1 to 10 weight percent of said matrix, calculated as metal, and (B) A crystalline zeolitic molecular sieve.

In accordance with an additional embodiment of the present invention there is provided a hydrocracking process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrocracked products from said reaction zone.

In accordance with additional embodiments of the present invention, a portion of the effluent from said reaction zone is catalytically reformed and/or a portion of said effluent is catalytically cracked.

It has been found that use of the catalyst body, or plural catalyst, of the present invention provides hydrocracking results superior to those obtainable with use alone of any separate catalyst contained in said body. More particularly, in the single-stage hydrocracking of light cycle oil it was found that use of the rhenium catalyst provided a high-octane $C_5$–180° F. gasoline product, but a low yield of total $C_5$+ gasoline. By contrast, the Group VIII cogel catalyst produced a high yield of $C_5$ gasoline, but a low-octane $C_5$+–180° F. gasoline. Since the $C_5$–180° F. gasoline octane cannot be upgraded easily by further processing, its poor blend characteristics are a severe handicap. The use of the catalyst body of the present invention provides a high yield of $C_5$+ total gasoline which has a high $C_5$–180° F. octane number. Hence, said catalyst body results in a product yield and product octane improvement, compared with the use of the separate catalysts alone.

The catalyst body of the present invention includes a separate catalyst comprising a crystalline zeolitic molecular sieve and rhenium or a compound of rhenium. It is not obvious from Rabo et al. U.S. Pat. 3,236,761 that a rhenium-crystalline zeolitic molecular sieve catalyst has application as a hydrocracking catalyst, or what rhenium levels such a catalyst should contain. Even if such matters were clear from Rabo et al., Wilson U.S. Pat. 3,278,418 would lead a man skilled in the art to conclude that such a catalyst would either need to contain *considerably* more than 2 weight percent rhenium or that it must contain an additional hydrogenating component to obtain adequate hydrocracking activity. It has been found that neither of these conclusions is correct. Wilson also would lead a man skilled in the art to conclude, even if he considered use for hydrocracking of the catalyst contained in the catalyst body of the present invention that contains rhenium or a compound of rhenium: (a) that it would need to contain an additional hydrogenating component in order to be able to maintain adequate hydrocracking activity at acceptably low rhenium levels; and (b) that such additional component would cause the catalyst stability to suffer markedly. These conclusions also are not correct. Accordingly, it has been found that the catalyst in the catalyst body of the present invention that contains rhenium or a compound of rhenium surprisingly provides advantages over the Rabo et al. platinum or palladium on molecular sieve hydrocracking catalyst and the Wilson rhenium-silica-alumina hydrocracking catalyst, while unexpectedly being free from disadvantages that the art would lead one to expect.

The catalyst body of the present invention is effective for various hydrocarbon conversion reactions, particularly hydrocracking, but including also hydrodesulfurization, hydrodenitrification, hydrogenation and hydroisomerization.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing the catalyst body of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst body of the present invention.

NITROGEN CONTENT OF FEEDSTOCKS

While the process of the present invention can be practiced with utility when supplying to the hydrocracking zone containing the catalyst body of the present invention, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million, more preferably, 0.5 to 100 parts per million. A prior hydrofining step may be used, if desired, to reduce the feed nitrogen content to the preferred level. The prior hydrofining step advantageously may also accomplish hydrogenation and a reasonable amount of hydrocracking. Because of the superior tolerance of the crystalline zeolitic molecular sieve components of the separate catalysts in the catalyst body of the present invention for organic nitrogen compounds, compared with amorphous silica-alumina gel, the hydrofining step need not accomplish complete organic nitrogen content reduction. Further, because of the superior tolerance of said components for ammonia, compared with silica-alumina gel, and because said components are more tolerant of ammonia than of organic nitrogen compounds, ammonia produced in the hydrofining zone either may be removed from the system between the hydrofining zone and the hydrocracking zone containing the catalyst body of the present invention comprising said components, or may be permited to pass into the hydrocracking zone along with the feed thereto.

SULFUR CONTENT OF FEEDSTOCKS

While the process of the present invention can be practiced with utility when supplying to the hydrocracking zone, containing the catalyst body of the present invention, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A CRYSTALLINE ZEOLITIC MOLECULAR SIEVE COMPOUND AND A RHENIUM OR RHENIUM COMPOUND HYDROGENATING COMPOUND (A) General.—The crystalline zeolitic molecular sieve component may be any crystalline zeolitic molecular sieve known to have utility as a component of a conventional hydrocracking catalyst. Especially useful are "X" and "Y" type faujasites. The sodium content of the molecular sieve desirably will be below 5 weight percent. An included form of molecular sieve is an ultra-stable form, that is, one in which the unit cell size is below 24.65 angstroms, the sodium content is below 3 weight percent, calculated as $Na_2O$, and the silica/alumina ratio is above about 2.15.

The rhenium hydrogenating component of the catalyst may be present in the final catalyst in the form of the metal, metal oxide, metal sulfide, or a combination thereof. The rhenium or compound thereof may be combined with the crystalline zeolitic molecular sieve cracking component, or may be combined with other catalyst components in which said cracking component is dispersed, or both. In any case, the rhenium will be present in an amount of 0.01 to 3.0 weight percent, based on said cracking component and calculated as the metal.

A preferred catalyst comprises said crystalline zeolitic molecular sieve cracking component intimately dispersed in particulate form in a matrix of other catalytic components comprising alumina and a hydrogenating component selected from the group consisting of Group VI metals and compounds thereof and Group VIII metals and compounds thereof, with the rhenium or compound thereof being combined with said cracking component before the latter is dispersed in the matrix, or with the rhenium or compound thereof being a portion of the matrix. Examples of suitable matrices include matrices comprising: (a) nickel or a compound thereof and silica-alumina; (b) nickel or a compound thereof and tungsten or a compound thereof and alumina; (c) nickel or a compound thereof and molybdenum or a compound thereof and alumina; (d) nickel or a compound thereof and tungsten or a compound thereof and titania and silica-alumina; (e) nickel or a compound thereof and molybdenum or a compound thereof and titania and silica-alumina; (f) molybdenum or a compound thereof, or tungsten or a compound thereof, and alumina or silica-alumina; (g) any of the foregoing with the addition of rhenium or a compound thereof in the previously indicated amount. If desired, the Group VIII metal may be cobalt, platinum, palladium or iridium, or compounds thereof.

(B) Method of preparation.—In the case wherein rhenium or a compound thereof is added directly to said cracking component, impregnation using an aqueous solution of a suitable rhenium compound or adsorption of a suitable rhenium compound are useful methods of incorporating the rhenium or compound thereof into the cracking component.

In the case wherein said cracking component first is dispersed in a matrix of other catalytic components and rhenium or a compound thereof is introduced into the resulting composition, again impregnation using an aqueous solution of a suitable rhenium compound or adsorption of a suitable rhenium compound are useful methods of introducing the rhenium or compound thereof.

The rhenium compound used in the impregnation or adsorption step generally will contain rhenium in anionic form. The compound should be one that is soluble in water, and that contains no ions that are known as contaminants in hydrocracking catalysts. Suitable rhenium compounds are perrhenic acid, $HReO_4$, and ammonium perrhenate, $NH_4ReO_4$. Impregnation also may be accomplished with an ammoniacal solution of rhenium heptoxide.

Where said cracking component, with or without added rhenium, is dispersed in a matrix of other catalyst components, the dispersion may be accomplished by cogelation of said other components around said cracking component in a conventional manner.

The finished catalyst, together with the catalyst comprising a Group VIII hydrogenating component, both of which are included in the catalyst body of the present invention, may be sulfided in a conventional manner prior to use, if desired. If not presulfided, the catalyst may become sulfided during process operation from any sulfur compounds that may be present in the hydrocarbon feed.

CATALYST COMPRISING A CRYSTALLINE ZEOLITIC MOLECULAR SIEVE COMPONENT, A COMPONENT SELECTED FROM SILICA-ALUMINA GEL, SILICA-ALUMINA-TITANIA GEL AND SILICA-ALUMINA-ZIRCONIA GEL, AND A COMPONENT SELECTED FROM GROUP VIII METALS AND COMPOUNDS THEREOF (A) General.—The crystalline zeolitic molecular sieve component may be as described above in connection with the rhenium-containing catalyst.

The weight percentages of various hydrogenating components of the catalyst, silica/alumina ratios, etc., are provided elsewhere herein.

(B) Method of preparation.—The crystalline zeolitic molecular sieve component, substantially in the ammonia or hydrogen form, may be maintained substantially free of any catalytic loading metal or metals, in accordance with a preferred embodiment of the present invention, by dispersing it in a slurry of the other catalyst components at a pH above 5, and causing gelation of said other components, preferably as soon as practicable after said dispersing, at a pH above 5. When a sodium form of crystalline zeolitic molecular sieve is one of the starting materials, it may be converted to the ammonia or hydrogen form by ion exchange prior to being combined with the other catalyst components. Alternatively, it may be combined with the other catalyst components and then converted to the ammonia or hydrogen form by ion exchange. In either case, the crystalline zeolitic molecular sieve component should not be combined with the precursors of the other catalyst components at a pH below 5.

SEPARATE HYDROFINING CATALYST (A) General.—A separate hydrofining catalyst may be disposed in a separate catalyst bed located ahead of a hydrocracking zone containing the catalyst body of the present invention, in the same reactor shell, eliminating interstage condensation, pressure letdown and ammonia and hydrogen sulfide removed. In a preferred arrangement using downflow of hydrocarbon feed, the bed of separate hydrofining catalyst is located above said catalyst body in the same reactor shell.

Where said separate hydrofining catalyst is located in the same reactor shell as the catalyst body of the present invention, it is preferably present in an amount in the range of 10 to 40 volume percent of the total amount of catalyst in the reactor.

In an arrangement less preferred than the ones discussed above in this section, the separate hydrofining catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor containing the catalyst body of the present invention.

In any of the arrangements discussed in this section, the separate hydrofining catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate hydrofining catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate hydrofining catalyst, comprising silica-alumina, are:

| | Percent by weight of total catalyst, calculated as metal | | | $SiO_2$ $Al_2O_3$ weight ratio |
|---|---|---|---|---|
| | Ni | Mo | W | |
| 1 | 4–10 | 15–25 | | 10/90–30/70 |
| 2 | 6–15 | | 15–30 | 30/70–50/50 |

It has been found that use of said separate hydrofining catalyst increases the gasoline yield from the hydrocracking stage containing the catalyst body of the present invention, compared with the gasoline yield from the hydrocracking stage when the identical feed thereto has not been first or concurrently processed in the presence of said separate hydrofining catalyst. The increased gasoline yield probably is related to the hydrogenation, in that more saturated hydrocarbon structures tend to crack more easily. Said separate hydrofining catalyst is particularly useful when the catalyst body of the present invention does not contain a catalyst comprising a Group VI component, and when the hydrocarbon feed to be hydrocracked contains more than 5 parts per million organic nitrogen. In this case, said separate hydrofining catalyst should be used to reduce the nitrogen content of the feed to below 5 parts per million, perferably below 1 part per million, organic nitrogen, before hydrocracking the feed in the presence of the catalyst body of the present invention.

(B) Method of preparation.—Said separate hydrofining catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst, in the catalyst body of the present invention, comprising rhenium or a compound thereof and a crystalline zeolitic molecular sieve has activity and stability advantages over a hydrocracking catalyst consisting of rhenium and a gel-type silica-alumina. It has been found that use of said separate hydrofining catalyst in the above-described arrangements further increases the stability of the hydrocracking catalyst containing rhenium or a compound thereof and a crystalline zeolitic molecular sieve, compared with the stability of the latter catalyst when the identical feed thereto has not been first or concurrenly processed in the presence of said separate hydrofining catalyst.

OPERATING CONDITIONS

The hydrocracking zone containing the catalyst body of the present invention is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing the catalyst body of the present invention, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably, 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst consisting of the catalyst body of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in this embodiment of the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains the catalyst body of the present invention. The hydrocarbon feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5^-$ 180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst consisting of the catalyst body of the present invention. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5^-$ 180° F. fraction which is withdrawn line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are given by way of exemplification only, and

PREPARATION OF RHENIUM-CONTAINING CATALYSTS SUITABLE FOR USE IN CATALYST BODY OF PRESENT INVENTION

Example 1

A catalyst consisting of rhenium and a crystalline zeolitic molecular sieve for use as one of the catalysts in the catalyst body of the present invention (Catalyst A) is prepared in the following manner.

These starting materials are used:

(1) 500 grams of a crystalline zeolitic molecular sieve, in particular a "Y" faujasite substantially in the ammonia form;

(2) 1000 cc. of an aqueous solution of perrhenic acid ($HReO_4$), containing 10.8 grams of rhenium.

The zeolite, in lumpy powder form, is introduced into a Hobart kitchen blender, followed by slow addition of the perrhenic acid solution while stirring, to form a pasty mass. The pasty mass is transferred to a dish and dried at 120° F. for approximately 16 hours. The resulting dried material is pressed through a 40-mesh screen to obtain fine granules. The granules are blended with a 1% Sterotex lubricant binder, and tabletted. The tablets are calcined in flowing air for 2 hours at 1200° F. The tabletted, calcined rhenium-containing material is crushed, and a resulting 8–16 mesh fraction thereof is separated for use as a catalyst in the process of the present invention. This catalyst contains an amount of rhenium approaching the theoretical amount based on the amounts of ingredients used. This indicates that, although rhenium oxides normally are quite volatile, in this method of preparation only a small amount of rhenium is lost during drying and calcination.

Example 2

A catalyst consisting of a rhenium-impregnated crystalline zeolitic molecular sieve in a matrix of other catalytic components, for use as one of the catalysts in the catalyst body of the present invention (Catalyst B) is prepared. The final catalyst consists of 20% of the catalyst of Example 1 and 80% of a matrix containing nominally 8% nickel, 18% tungsten, 7% titanium dioxide, 30% alumina and 30% silica.

The catalyst of this example is prepared in the following manner:

(1) The impregnated molecular sieve, metals, silica and alumina are combined in a solution.
(2) The solution is gelled by pH control.
(3) The resulting slurry is filtered, washed and dried.
(4) The dried filter cake is tabletted, calcined in flowing air for 5 hours, and crushed for use as a catalyst.

PREPARATION OF NON-RHENIUM-CONTAINING CATALYSTS SUITABLE FOR USE IN CATALYST BODY OF PRESENT INVENTION

Example 3

A cogelled catalyst (Catalyst C) of the following composition was prepared:

| Component: | Wt. percent of total catalyst |
|---|---|
| NiO | 9.2 |
| $WO_3$ | 22.7 |
| $TiO_2$ | 7.2 |
| $Al_2O_3$ | 27.0 |
| $SiO_2$ | 23.9 |
| "Y" faujasite, ammonia form | 10.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing $AlCl_3$, $TiCl_4$, $NiCl_2$ and acetic acid;

(2) Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions would occur at a neutral pH of about 7.

(3) The acidic and alkaline solutions were combined, and coprecipitation of all of the metal-containing components of the solutions occurred at a pH of about 7, resulting in a slurry.

(4) A crystalline zeolitic molecular sieve in finely divided form was added to the slurry.

(5) The zeolite-containing slurry was filtered to produce a zeolite-containing hydrogel filter cake, which was washed repeatedly with dilute ammonium acetate solution, to remove sodium and chloride ionic impurities from both the hydrogel and the zeolite contained therein.

(6) The zeolite-containing hydrogel was dried in an air-circulating oven and then was activated in flowing air for 5 hours at 950° F.

The finished catalyst was characterized by a surface area of 384 $M.^2/g.$, a pore volume of 0.4 cc./g., and an average pore diameter of 42 angstroms, and a zeolitic component substantially free of catalytic metals; that is, substantially all of the nickel, tungsten and titanium contained in the catalyst was located in the gel portion of the catalyst rather than in the zeolitic component thereof.

USE OF CATALYST BODY OF PRESENT INVENTION

Example 4

A physical mixture of Catalysts A and C, of Examples 1 and 3, respectively, is used to hydrocrack a light cycle oil hydrocarbon feedstock of the following description:

| | |
|---|---|
| Gravity, ° API | 19.5 |
| Aniline point, ° F. | 62 |
| Sulfur content, weight percent | 0.43 |
| Nitrogen content, parts per million | 330 |
| Aromatics content, liquid volume percent | 70 |
| Boiling range, ASTM D-1160 distillation: | |
| ST/5 | 381/471 |
| 10/30 | 492/532 |
| 50 | 568 |
| 70/90 | 598/635 |
| 95/EP | 648/681 |

The hydrocracking is accomplished, on a once-through basis, at an average catalyst temperature of 732° F., a pressure of 2100 p.s.i.g., a liquid hourly space velocity of 0.9, and a hydrogen supply rate of 12,000 s.c.f. per barrel of hydrocarbon feedstock. The gasoline product octane is higher than the gasoline product octane resulting from hydrocracking the same feed under the same conditions with Catalyst C above. The gasoline product yield is greater than the gasoline product yield resulting from hydrocracking the same feed under the same conditions with Catalyst A above. Similar improvements result from using a physical mixture of Catalysts B and C, of Examples 2 and 3, respectively, to hydrocrack a similar feed under similar conditions.

Example 5

The 180°–400° F. portion of the product of Example 4 is catalytically reformed, using a conventional reforming catalyst and conventional reforming conditions, and is found to be a superior feedstock for this operation. The catalytic reformate is combined with the $C_5$–180° F. portion of the product of Example 4, to produce a gasoline pool.

Example 6

The 400° F.+ portion of the product of Example 4 is recycled to the catalytic cracking unit which produced the light cycle oil feed used in Example 4. This upgrades the total feed to the catalytic cracking unit, and causes decreased coke production and increased gasoline production in that unit. These improved results are made possible because of the improved characteristics of the 400° F.+ materials recycled from the hydrocracking zone to the catalytic cracking unit, compared with the approximately 400° F.+ light cycle oil supplied to the hydrocracking zone from the catalytic cracking unit.

What is claimed is:

1. A catalyst body consisting of a physical mixture of pellets or other particles of different catalysts, said different catalysts comprising:
    (1) A first catalyst comprising a crystalline zeolitic molecular sieve component, and a component selected from rhenium and compounds of rhenium, and
    (2) A second catalyst comprising a crystalline zeolitic molecular sieve component, a component, selected from silica-alumina gel, silica-alumina-titania gel and silica-alumina-zirconia gel, and a component selected from Group VIII metals and compounds thereof.

2. A catalyst body as in claim 1, wherein said second catalyst further comprises a component selected from Group VI metals and compounds thereof.

3. A catalyst body as in claim 1, wherein said crystalline zeolitic molecular sieve in said second catalyst is substantially in the ammonia or hydrogen form, and is substantially free of any catalytic metal or metals.

4. A catalyst body as in claim 1, wherein said rhenium or compound thereof is present in said first catalyst in an amount of 0.01 to 3.0 weight percent, based on said first catalyst and calculated as the metal.

5. A catalyst body as in claim 1, wherein said Group VIII metal or compound thereof is present in said second catalyst in an amount of 0.01 to 15 weight percent, based on said second catalyst and calculated as the metal.

6. A catalyst body as in claim 1, wherein said Group VIII metal or compound thereof in said second catalyst is nickel or a compound thereof, and wherein said second catalyst further comprises tin or a compound thereof.

7. A catalyst body as in claim 1, wherein said crystalline zeolitic molecular sieve is present in said second catalyst in an amount of 1 to 50 weight percent thereof.

8. A catalyst body consisting of a physical mixture of pellets or other particles of different catalysts, said different catalysts comprising:
    (1) A first catalyst consisting essentially of a crystalline zeolitic molecular sieve component and a component selected from rhenium and compounds of rhenium;
    (2) A second catalyst consisting essentially of:
        (A) A porous Xerogel comprising:
            (a) At least 15 weight percent silica,
            (b) alumina, in an amount providing an alumina-to-silica weight ratio of 15/85 to 80/20,
            (c) nickel, in the form of metal, oxide, sulfide or any combination thereof, in an amount of 1 to 10 weight percent of said Xerogel, calculated as metal,
            (d) tungsten, in the form of metal, oxide, sulfide or any combination thereof, in an amount of 5 to 25 weight percent of said Xerogel, calculated as metal,
            (e) titanium oxide, in an amount of 1 to 10 weight percent of said Xerogel, calculated as metal,
        (B) A crystalline zeolitic molecular sieve, in an amount of 1 to 50 weight percent of said catalyst, said zeolitic molecular sieve being in the form of particles, said particles being dispersed through said Xerogel;
said second catalyst having an average pore diameter below 100 angstroms and a surface area above 200 square meters per gram.

9. A catalyst body consisting of a physical mixture of pellets or other particles of different catalysts, said different catalysts comprising:
    (1) A catalyst comprising:
        (A) A crystalline zeolitic molecular sieve, and
        (B) A hydrogenating component selected from rhenium and compounds of rhenium; and
    (2) A catalyst comprising:
        (A) A gel matrix comprising:
            (a) at least 15 weight percent silica,
            (b) alumina, in an amount providing an alumina-to-silica weight ratio of 15/85 to 80/20,
            (c) a Group VIII component, in the form of metal, oxide, sulfide or any combination thereof, in an amount of 1 to 10 weight percent of said matrix, calculated as metal, and
        (B) A crystalline zeolitic molecular sieve.

10. A hydrocracking process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrocracked products from said reaction zone.

11. A process as in claim 10, wherein a portion of the effluent from said reaction zone is catalytically reformed.

12. A process as in claim 10, wherein a portion of the effluent from said reaction zone is catalytically cracked.

References Cited

UNITED STATES PATENTS

| | | | |
|---|---|---|---|
| 3,132,087 | 5/1964 | Kelley et al. | 208—60 |
| 3,140,253 | 7/1964 | Plank et al. | 208—120 |
| 3,236,762 | 2/1966 | Rabo et al. | 208—111 |
| 3,238,123 | 3/1966 | Voorhies et al. | 208—264 |

FOREIGN PATENTS

| | | | |
|---|---|---|---|
| 1,363,673 | 5/1964 | France | 208—120 |

DELBERT E. GANTZ, Primary Examiner

A. RIMENS, Assistant Examiner

U.S. Cl. X.R.

208—61, 111; 252—455